Patented Jan. 7, 1947

2,413,961

UNITED STATES PATENT OFFICE 2,413,961

PELLETING OF CATALYSTS

William G. Evans, Riverside, Ill., assignor to Universal Oil Products Company, Chicago, Ill., a corporation of Delaware No Drawing. Application April 5, 1944, Serial No. 529,668

5 Claims. (Cl. 252—259.2)

This invention relates to the manufacture of formed catalyst particles, the present application being a continuation-in-part of my earlier application Serial No. 413,307, filed October 2, 1941, which is in turn a continuation-in-part of application Serial No. 367,063, filed November 25, 1940. More specifically, the invention provides a new type of lubricant which is particularly useful in the formation of catalyst particles having good strength and activity.

It is generally known that substances usually called lubricants are added to powders which are to be made into shaped forms such as pills or pellets. The primary function of these substances is to lubricate the dies and punches of the pilling machine, thereby decreasing breakage resulting from over-heating. Soaps such as alkali metal or calcium and aluminum soaps of stearic acid, for example, have been used with good results in some applications. Frequently an additional substance such as flour which may have properties which are not detrimental to the product is added to assist in binding the powder together in the shaped particles. A number of other qualities are necessary or desirable in a "pilling aid" as will become apparent in the following specification.

In one embodiment the present invention comprises mixing a small proportion of wood rosin with a catalyst, forming the mixture into shaped particles and subsequently removing the wood rosin at an elevated temperature.

I have found that the use of wood rosin as a lubricant in the pilling or pelleting of powdered refractory materials permits the attainment of long continuous periods of operation of the pilling machines by the elimination of excessive wear or breakage of the dies and punches. These periods of continuous operation are considerably in excess of those heretofore attainable when using the various other lubricants well known in the art, such as natural gums.

Wood rosin which is usually obtained as a residue in the distillation of turpentine from pine trees is ordinarily not considered a lubricant in the usual sense of the word since it is used to offer resistance to slipping on various surfaces such as floors, violin bows, etc. It has been found however, when a small amount of rosin is mixed with a catalyst material, that the rosin operates as a very effective lubricant. Although the use of the rosin is not restricted to the formation of shaped particles from any particular powdered adsorbent or catalytic material, it has been found in the preparation of pelleted silica-alumina cracking catalyst that considerably less wear on the dies and punches is distinctly noticeable than for a conventional pilling aid such as a mixture of flour and stearic acid. The pilling machines are smoother running when pilling with rosin and there is much less replacement of the moving parts for a given amount of material added to facilitate pelleting. More perfectly formed particles are also obtained when using the rosin and the particles are less subject to breakage. A number of other advantages have been observed. For example, it is possible to produce good pills from a catalyst powder that has a wider range of moisture content when using the rosin pilling aid since in this particular example the moisture content might vary as much as from 15 to 40% without producing unsatisfactory pills whereas with another type of pilling aid, the moisture content of the powder had to be restricted to approximately 20%. It has also been observed that pilled granules having lower densities and suitable strength can be produced using resinous materials than can be produced with other pilling aids. These low density catalysts not only have increased activity but are also thermally stable at the high temperatures, employed in calcining treatment. A further advantage is possessed by rosin since in catalysts of the present type it is necessary to remove the lubricant by calcination and in the presence of an oxygen-containing gas. In heating the rosin-containing particles a large portion of the rosin is removed by vaporization rather than by carbonization. Where the material is carbonized to form a carbon residue it is obviously more difficult to remove the residue by oxidation than when the organic material added is largely removed by vaporization.

The amount of rosin added will vary according to the fineness of the powder, the shape into which the particles are formed and the texture of the material pelleted. Generally speaking, from 2 to 10% or more by weight of the material pelleted may be used, the amount used, however, being usually smaller than that used for the conventional pilling aids.

A number of variations may be employed in the use of the rosin. Rather than pulverizing the material to be pelleted and the rosin separately these may be mixed together in the desired proportions and then pulverized prior to shaping into particles. When mixing 5% rosin wtih a catalyst in this manner and pilling, pilling machines have operated over a very long period of time without any complications in the pilling operations. Where a very fine powder has to be pilled it may be desirable to mix the rosin with the fine powder and preliminarily compress the material as in a hydraulic press, for example, and then crush the material to pass a 20, 30 or 40 mesh sieve before pilling. Another variation which may be used in special cases may consist in mixing approximately one per cent of a hydrogenated vegetable oil with the material to be pelleted in addition to the rosin added as a lubricant.

The following examples are given to illustrate specific applications of the rosin to catalyst manufacture, the general procedure and the activity of the resulting catalyst pellets being also indicated. The invention should not be considered as limited to these examples or to the particular catalyst compositions since these are given as illustrations of the novelty and utility of the invention. The rosin may be employed generally in the preparation of adsorbent and catalysts useful in numerous types of adsorptions and catalytic reactions such as hydrogenation, dehydrogenation, catalytic cracking, catalytic reforming, and numerous other types of organic and inorganic reactions where catalyst masses are employed.

Example I

A purified precipitated hydrated silica was suspended in a solution of aluminum and zirconyl chlorides and ammonium hydroxide added thereto to precipitate hydrated alumina and hydrated zirconia in the presence of the suspended hydrated silica. The precipitate was washed, filtered and dried to a water content of approximately 23%. It was then crushed to pass a 40 mesh sieve and mixed with 4% of its weight of a commercial rosin which had been pulverized to pass an 80 mesh sieve. The mixture was then pelleted in a pilling machine to form ⅛" cylindrical pills having a bulk density of approximately 1.0. These pills were rather hot and of somewhat rubebr-like consistency when freshly ejected from the pilling machine but upon cooling they assumed a hard desirable texture. These pellets were then heat treated at approximately 1650° F. for 6 hours in the presence of air in order to remove the rosin for the major part by vaporization and in minor part by decomposition and oxidation. The calcining conditions of temperature, are not those necessary to completely remove the added rosin but are determined largely by the test conditions desirable to shrink and render the catalyst material itself into a stable and active form. The calcined pills had a bulk density of approximately 1.1 and showed a 23.2% production of gasoline in converting a gas oil into gasoline and gas under standardized testing conditions.

Similarly, a mixture of the same proportion of catalyst and rosin was pelleted to produce catalyst pills having a bulk density of approximately 0.97 after calcining treatment which showed 22.9% conversion of gas oil to gasoline after calcining under similar conditions as above. In both of these operations the pilling machine functioned very smoothly and the pills were practically all in perfect form, in other words, practically none of them were in a fractured condition. The punches and dies of the pelleting machine were in excellent shape after forming approximately a pound of these pills.

On the other hand, when using with the same catalyst a conventional pilling aid consisting of 4% flour plus 2% stearic acid and pilling to the corresponding bulk density and resulting in calcined pills having substantially the same density and activity after calcination, it was found that although the punches and dies of the machine were new when starting the operation it was necessary to replace them after pilling a similar amount of material as was used above when pilling with the rosin. It was apparent that the pilling machine was under strain when the latter material was pilled and the pellets themselves were of an inferior quality because a large portion of them were in a fractured condition. The preparation of pills using flour and stearic acid pilling aid were further favored in the above batch by reducing the moisture content to approximately 19%.

When pills having spherical ends were prepared, 6% rosin was used instead of 4% and there was only a very small amount of fracturing of the curved ends of the pelleted particles. Similar improvements are shown for the rosin aid whether it is compared with starch and stearic acid or starch alone.

Example II

In the manufacture of a hydrogenation catalyst 96 parts by weight of an intimate mixture of kieselguhr and nickel carbonate powder passing a 40 mesh screen was mixed with 4 parts by weight of ordinary rosin ground to pass an 80 mesh screen and the composite was pelleted to form cylindrical pills ⅛" long and ⅛" in diameter. No difficulty was experienced in the operation of the pilling machine and very few of the pellets were fractured or imperfectly formed. These pellets were then heated in a current of air for approximately 12 hours at a temperature ranging from approximately 100 up to 370° C. after which they were reduced in a stream of hydrogen for 12 hours at a temperature of above 425° C. Similarly, pelleted material was made using 4% flour and 2% stearic acid with 94% of the kieselguhr-nickel carbonate mixture. The bulk density of these catalysts were approximately the same after calcining and reducing treatment but approximately 35% of the pellets made using the flour-stearic acid lubricant were in a fractured condition.

Example III

An attempt was made to prepare a catalyst similar to the hydrogenation catalyst of Example II by employing a mixture of 96 parts by weight of kieselguhr and nickel carbonate powder passing through a 40 mesh screen and 4 parts by weight of gum tragacanth. The pilling operation was unsuccessful because the punches froze and it was necessary to immediately stop the machine to prevent breakage of the punches.

Example IV

An attempt was made to prepare a catalyst similar to that shown in Example II by preparing a mixture of 96 parts by weight of nickel carbonate and kieselguhr and 4 parts by weight of gum karaya. Here again the pelleting operation was unsuccessful because the punches immediately became overheated and froze necessitating the termination of the pelleting operation before excessive damage occurred to the pelleting machine.

From the results obtained in the above examples it is apparent that wood rosin as a lubricant possesses superior qualities over the usual lubricants employed in the pelleting operation.

I claim as my invention:

1. In the mechanical pelleting of powdered adsorbent and catalytic materials, the method of reducing wear and breakage of the dies and punches of the pelleting machine and for producing pellets of relatively low density and high thermal stability, which comprises pelleting the powdered material in said machine in admixture with a relatively small amount of a lubricant consisting essentially of wood rosin, and heating the resultant pellets to substantially remove the rosin therefrom.

2. In the mechanical pelleting of powdered adsorbent and catalytic materials, the method of reducing wear and breakage of the dies and punches of the pelleting machine and for producing pellets of relatively low density and high thermal stability, which comprises pelleting the powdered material in said machine in admixture with a relatively small amount of a lubricant consisting essentially of wood rosin, and heating the resultant pellets in the presence of air to substantially remove the rosin therefrom.

3. In the mechanical pelleting of powdered catalytic material comprising silica gel, the method of reducing wear and breakage of the dies and punches of the pelleting machine and for producing strong catalyst pellets of high activity, which comprises pelleting the powdered material in said machine in admixture with a relatively small amount of a lubricant consisting essentially of wood rosin, and heating the resultant pellets to substantially remove the rosin therefrom.

4. In the mechanical pelleting of powdered catalytic material comprising silica and alumina, the method of reducing wear and breakage of the dies and punches of the pelleting machine and for producing strong catalyst pellets of high activity, which comprises pelleting the powdered material in said machine in admixture with a relatively small amount of a lubricant consisting essentally of wood rosin, and heating the resultant pellets to substantially remove the rosin therefrom.

5. The method as defined in claim 1 further characterized in that the powdered material comprises kieselguhr and a reducible nickel compound and in that said pellets are subjected to a reducing treatment after the removal of rosin therefrom.

WILLIAM G. EVANS.